United States Patent [19]

Lu et al.

[11] Patent Number: 5,457,570
[45] Date of Patent: Oct. 10, 1995

[54] ULTRAVIOLET RESISTIVE ANTIREFLECTIVE COATING OF $TA_2O_5$ DOPED WITH $AL_2O_3$ AND METHOD OF FABRICATION

[75] Inventors: Samuel Lu, Agoura; Ming-Jau Sun, Woodland Hills; Alan F. Stewart, Thousand Oaks, all of Calif.; Anthony W. Louderback, Eugene, Oreg.

[73] Assignee: Litton Systems, Inc., Beverly Hills, Calif.

[21] Appl. No.: 67,863

[22] Filed: May 25, 1993

[51] Int. Cl.⁶ .................................................... G02B 5/20
[52] U.S. Cl. ........................... 359/361; 359/885; 359/581; 359/586
[58] Field of Search ................................. 359/359, 361, 359/885, 580, 581, 586

[56] References Cited

U.S. PATENT DOCUMENTS

| | | | |
|---|---|---|---|
| Re. 32,849 | 1/1989 | Wei et al. | 204/192.2 |
| 3,741,657 | 6/1973 | Andringa | 356/106 |
| 4,063,803 | 12/1977 | Wright et al. | 359/894 |
| 4,213,705 | 7/1980 | Sanders | 356/350 |
| 4,579,750 | 4/1986 | Bowen et al. | 427/53.1 |
| 4,583,822 | 4/1986 | Southwell | 359/586 |
| 4,685,110 | 8/1987 | DeBell et al. | 372/103 |
| 4,793,908 | 12/1988 | Scott et al. | 204/192.2 |
| 4,809,293 | 2/1989 | DeBell et al. | 372/948 |
| 4,827,870 | 5/1989 | Lee | 118/665 |
| 4,866,250 | 5/1989 | Southwell | 392/479 |
| 4,904,083 | 2/1990 | Lu et al. | 356/350 |
| 4,907,846 | 3/1990 | Tustison et al. | 359/359 |
| 4,925,259 | 5/1990 | Emmett | 359/359 |
| 4,934,788 | 6/1990 | Southwell | 359/586 |
| 4,966,437 | 10/1990 | Rahn | 359/586 |
| 5,147,125 | 9/1992 | Austin | 359/359 |
| 5,168,388 | 12/1992 | Tamada et al. | 359/328 |
| 5,170,291 | 12/1992 | Szczyrbowski et al. | 359/586 |

FOREIGN PATENT DOCUMENTS

379738A3 12/1989 European Pat. Off..

*Primary Examiner*—Loha Ben
*Assistant Examiner*—Thomas Robbins
*Attorney, Agent, or Firm*—Lynn & Lynn

[57] ABSTRACT

A coating for an optical component is formed to be antireflective for a selected wavelength and resistive to the transmission of ultraviolet radiation. The coating has first layer is formed of a dielectric material having a refractive index $n_1$ coated onto the optical component. A second layer is formed of a dielectric layer having a refractive index $n_2$ that is smaller than the refractive index $n_1$ of the first layer. The second layer is formed of a material that transmits the selected wavelength while blocking ultraviolet light, thereby protecting the first layer and the optical component from damage due to exposure to ultraviolet radiation. The thicknesses of the layers is selected so that the coating is antireflective for the selected wavelength.

4 Claims, 1 Drawing Sheet

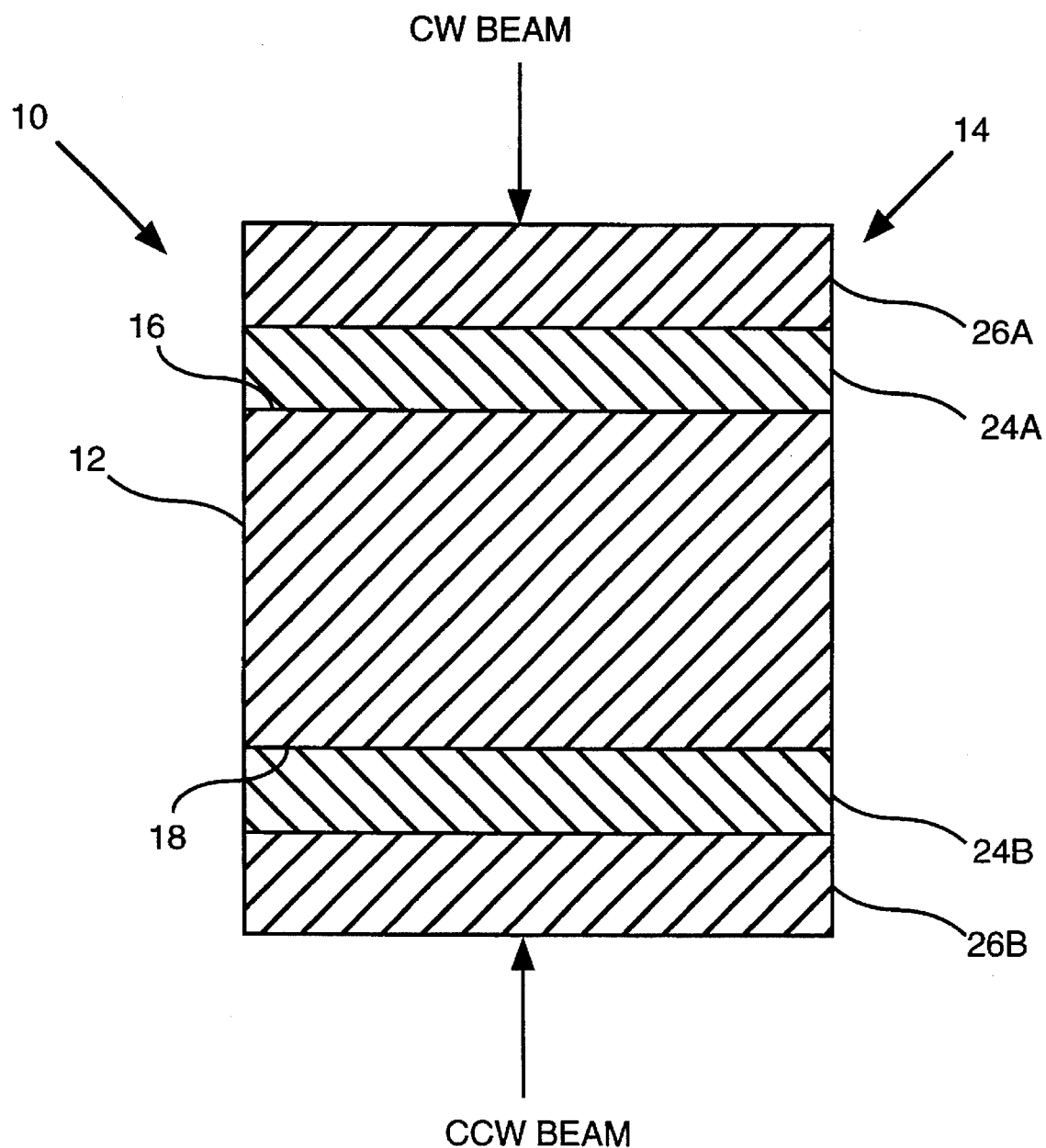

1

ULTRAVIOLET RESISTIVE ANTIREFLECTIVE COATING OF TA$_2$O$_5$ DOPED WITH AL$_2$O$_3$ AND METHOD OF FABRICATION

BACKGROUND OF THE INVENTION

This invention relates generally to optical coatings for controlling the reflection and transmission of particular optical wavelengths at an optical surface. This invention relates particularly to a structure and method of fabrication of an ultraviolet resistive, antireflective coating for a component of an optical system. Still more particularly, this invention relates to an ultraviolet resistive, antireflective coating for an intra-cavity element of a multioscillator ring laser gyroscope.

A ring laser gyroscope employs the Sagnac effect to measure rotation. Counterpropagating light beams in a closed path have transit times that differ in direct proportion to the rotation rate about an axis perpendicular to the plane of the path. In a ring laser gyroscope the closed path is defined by mirrors that direct the light beams around the path. The path is generally either square or triangular in shape, although any closed polygonal path could, in principle, be used. The closed path is typically in a cavity formed in a frame or body that is formed of a glass ceramic material.

The cavity is evacuated and then filled with a mixture of helium and neon, which is the gain medium for the laser. An electrical discharge excites the gain medium, which produces light amplification and a coherent light source. The mirrors must be precisely aligned to direct the light beams around the closed path in a manner that promotes proper operation of the laser. The mirror surface must be free of impurities to provide a laser beam intensity that will result in a usable signal.

Once laser oscillation occurs in the system at resonant frequencies, the difference in the length of the pathways traversed by the counterpropagating laser beams result in a difference or beat frequency which is sensed by a photodetector and amplified by an amplifier. The beat frequency is a result of optically heterodyning the counter propagating beams.

It is well-known that a ring laser gyroscope that employs two counterpropagating waves is subject to the phenomenon of lock-in at low rotation rates. At rates below a threshold value, a two-mode ring laser gyroscope will erroneously indicate that the rotation rate is zero. When the frequency difference between the waves is too small, the frequencies appear to be equal, which gives an erroneous indication of a zero rotation rate.

One type of ring laser gyroscope that eliminates lock-in is the Zeeman ring laser gyroscope, which is sometimes referred to as the Zero Lock rotation sensor. Zero Lock is a trademark of Litton Systems, Inc. The Zero Lock rotation sensor has two pairs of (counterpropagating) circularly polarized waves propagating in the resonant cavity simultaneously. One pair of counterpropagating waves consists of right circularly polarized light waves propagating in the clockwise and counterclockwise directions. The other pair consists of left circularly polarized waves which are also propagating in the clockwise and counterclockwise directions within the same resonant cavity. Such a four mode ring laser gyroscope configuration is described in detail in U.S. Pat. No. 3,741,657, issued Jun. 26, 1973 to Enduring and in U.S. Pat. No. 4,213,705, issued Jul. 22, 1980 to Sanders.

Operation of a four mode laser gyroscope is briefly described below.

Disposed in the path of the propagating waves within the cavity are reciprocally anisotropic and non reciprocally anisotropic dispersive elements. A reciprocally anisotropic dispersive element, such as an optical rotator made of crystalline quartz, provides different propagation time delays (or different optical indices) to right and left circularly polarized waves. This difference in optical index due to sense of polarization results in an optical path length difference between oppositely polarized waves resonating within the same cavity. The non reciprocally anisotropic dispersive element, for example a Faraday cell, presents different refractive indices for light waves traveling in opposite directions. The waves traveling in the counterclockwise and clockwise directions thus have different propagation time delays in the Faraday cell. This difference in propagation time delays produces different path lengths for light waves traveling in opposite directions. Therefore, the combination of the two types of anisotropy can be used to adjust the frequency separation between resonant modes such that all four modes resonate at different frequencies.

Separation between the resonant mode frequencies is accomplished so that the resonant frequencies of the two waves traveling in one direction are spaced between the resonant frequencies of the two waves traveling in the opposite direction. The two highest frequency modes have the same circular polarization but opposite directions of propagation. Likewise, the two lowest frequency modes have the same circular polarization, opposite from the sense of polarization of the other pair and are also counter rotating in the cavity. Each pair of like-polarized modes operates in a separate two mode laser gyro. As the ring laser system is rotated about an axis perpendicular to the plane of the propagating waves, the frequency separation between the two higher frequency modes will either decrease or increase while the frequency separation between the two lower frequency modes will either increase or decrease. The output beat signal resulting from combining the two lower frequency modes is subtracted from the output beat signal resulting from combining the two higher frequency modes. This produces a substantially linear representation of the rotation rate of the laser system. The direction of rotation is determined by monitoring one of the pair of modes.

The intracavity element presents difficulties in using a Zero Lock rotation sensor for rotation sensing. The cavity is basically evacuated and has a refractive index of about 1.00. The intracavity element has a refractive index that is greater than that of the optical medium in the cavity. Therefore, reflections occur when the waves impinge upon the intracavity element. These reflections cause undesirable mode coupling and resonator losses, which reduce the accuracy of the output from the Zero Lock rotation sensor.

Antireflective coatings have been used on intracavity elements to reduce the amount of light reflected by the intracavity elements. These coatings have had to meet stringent requirements for thickness. The prior art procedure for fabricating such coatings involves depositing the first layer to a thickness greater than required, measuring the thickness of the first coating, and then milling down to the desired thickness. Difficulty in satisfying the requirements for thickness of the coatings causes errors and increases the cost and time for constructing a suitable intracavity element.

There are several prior art antireflective coatings. For example U.S. Pat. No. 4,966,437, issued Oct. 30, 1990 to Rahn and U.S. Pat. No. 4,907,846, issued Mar. 13, 1990 to Tustison et al. describe previous antireflective mirror coatings. The disclosures of U.S. Pat. Nos. 4,966,437 and 4,907,846 are hereby incorporated by reference into the present disclosure.

SUMMARY OF THE INVENTION

The present invention provides a two-layer coating for an intracavity element that is easy to fabricate and which has reduced tolerance on the thickness requirements for the inner layer.

A multilayer according to the present invention coating for an optical component is formed to be antireflective for a selected wavelength and resistive to the transmission of ultraviolet radiation. The first layer is formed of a dielectric material having a refractive index $n_1$ coated onto the optical component. The second layer is formed of a dielectric layer having a refractive index $n_2$ that is smaller than the refractive index $n_1$ of the first layer. The second layer is formed of a material that transmits the selected wavelength while blocking ultraviolet light, thereby protecting the first layer and the optical component from damage due to exposure to ultraviolet radiation.

The optical component may comprises a block of crystalline $SiO_2$ while the first layer preferably comprises $Ta_2O_5$ doped with $Al_2O_3$ and the second layer preferably comprises $Al_2O_3$. The first and second layers preferably have thicknesses approximately one fourth of the selected wavelength.

The first layer may comprise $Ta_2O_5$ doped with $TiO_2$ while the second layer comprises $Al_2O_3$ to provide protection against damage due to ultraviolet exposure.

An appreciation of the objectives of the present invention and a more complete understanding of its structure and method of operation may be had by studying the following description of the preferred embodiment and by referring to the accompanying drawings.

BRIEF DESCRIPTION OF THE DRAWINGS

The Figure illustrates an intracavity element for a Zero Lock rotation sensor laser gyroscope having an antireflective coating applied thereto.

DESCRIPTION OF THE PREFERRED EMBODIMENT

Referring to the Figure, an intracavity element 10 for a Zeeman ring laser gyroscope (not shown) comprises a block 12 of a material that produces the desired circular polarization-dependent time delays for light waves incident thereon. The invention is described with reference to the intracavity element 10 only for the purpose of facilitating explanation of the basic principles of the invention. The present invention is not limited in its application to the intracavity element 10. The present invention may be used in any application where an antireflective coating that is resistive to damage from exposure to ultraviolet radiation is desired.

The light waves are indicated by the arrows labeled CW BEAM and CCW BEAM. As explained above, the intracavity element 10 should have an antireflective coating 14 for the optical wavelength that is amplified by the gain medium (not shown) in the Zero Lock rotation sensor. It is well-known that antireflective coatings may be formed by placing one or more layers of a dielectric of appropriate refractive index and thickness on the surfaces 16 and 18 of the block 12 where the laser light is incident.

A two layer coating antireflective 14 includes a first layer 24A coated onto the surface 16 of the block 12. The layer 24A preferably is formed from a high refractive index material. A second layer 26A is coated onto the first layer 24A. The second layer 26A is formed from a material having a refractive index smaller than that of the refractive index of the first layer 24A. The two layer coating 14 is commonly known as a V-coat. It has a very narrow acceptance angle for the wavelengths that exist in the ZLG. The preferred gain medium in the ZLG is a mixture of helium and neon that lases at 6328Å.

The block 12 preferably is formed of crystalline silicon dioxide, $SiO_2$, which has a refractive index of about 1.46. The high refractive index layer 24A is preferably tantala, $Ta_2O_5$, that has been doped with alumina. Tantala has a refractive index of about 2.05. The tantala is preferably doped with the alumina to achieve a refractive index of about $n_2=1.98$. The low refractive index layer 26A is formed on the high refractive index layer 24A. The outer layer 26A formed of $Al_2O_3$ having a refractive index $n_2=1.65$, which blocks ultraviolet radiation and prevents UV damage to the layer 24A and the block 12.

Each layer should be a quarter wave plate. Therefore the thickness, T, of each layer is equal to $\lambda/4n$ where n is the refractive index of the layer material and $\lambda$ is the wavelength of the light in vacuum. It is assumed that the light is normally incident on the intracavity element 10.

Similarly high and low refractive index coatings 24B and 26B are formed on the surface 18 of the block. One of the counterpropagating waves, for example the clockwise wave, is incident upon the layer 26A and is transmitted through the layers 26A and 24A, the block 12, and the layers 24B and layer 26B without reflection. The other wave is incident upon the layer 26B and is also transmitted without reflection.

The two layer coating 14 formed according to the present invention has the advantage of allowing about a 16% tolerance in the thickness of the two inner coatings 24A and 24B. This advantage arises from the relationship between the refractive indices of $Ta_2O_5:Al_2O_3$ and $Al_2O_3$. Because of the relatively small difference between the refractive indices of the two layers, a small variation in the thickness of the inner layer 24A formed of $Ta_2O_5:Al_2O_3$ does not produce a significant effect on the antireflective nature of the coating 14. The outer coatings 26A and 26B may be milled, if necessary, to adjust the antireflective property of the composite coatings to a specified frequency.

Oxides such as $SiO_2$, $TiO_2$, $HfO_2$, $ZrO_2$, $Ta_2O_5$, for example, exhibit a shift in birefringence under prolonged exposure to ultraviolet radiation. The direction of the shift in birefringence depends upon the material. The birefringence shifts in $Ta_2O_5:Al_2O_3$ and $Al_2O_3$, in particular, are opposite. This invention uses $Ta_2O_5$ doped with $Al_2O_3$ to a degree appropriate to produce a zero birefringence shift for the 6328Å wavelength in the ZLG.

Other materials having opposite birefringence shifts may also be combined to produce a layer having essentially zero shift in birefringence upon UV exposure. One such combination of materials is a mixture of $TiO_2$ and $Ta_2O_5$ to produce the high index layer. The low index layer can be a material such as $SiO_2$ or $Al_2O_3$. The outer layer formed $Al_2O_3$ blocks ultraviolet radiation and prevents UV damage to the inner layer.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A multilayer coating for an optical component that comprises a block of crystalline $SiO_2$, the coating being antireflective for a selected wavelength and resistive to the transmission of ultraviolet radiation, comprising:

a first layer foraged of a dielectric material that comprises $Ta_2O_5$ doped with $Al_2O_3$ and having a refractive index $n_1$ coated onto the optical component; and a second layer formed of a dielectric layer that comprises $Al_2O_3$ and having a refractive index $n_2$ that is smaller than the refractive index $n_1$ of the first layer, the second layer being formed of a material that transmits the selected wavelength while blocking ultraviolet light, thereby protecting the first layer and the optical component from damage due to exposure to ultraviolet radiation.

2. The multilayer coating of claim 1 wherein the first and second layers have thicknesses approximately one fourth of the selected wavelength.

3. A method for forming a multilayer coating for an optical component that comprises a block of crystalline $SiO_2$, the coating being antireflective for a selected wavelength and resistive to the transmission of ultraviolet radiation, comprising the steps of:

forming a first layer a dielectric material that comprises $Ta_2O_5$ doped with $Al_2O_3$ and having a refractive index $n_1$ coated onto the optical component; and forming a second layer of a dielectric layer that comprises $Al_2O_3$ and having a refractive index $n_2$ that is smaller than the refractive index $n_1$ of the first layer, the second layer being formed of a material that transmits the selected wavelength while blocking ultraviolet light, thereby protecting the first layer and the optical component from damage due to exposure to ultraviolet radiation.

4. The method of claim 3 including the steps of forming the first and second layers to have thicknesses that are approximately one fourth of the of the selected wavelength.

* * * * *